United States Patent
Wilson et al.

(10) Patent No.: US 12,472,944 B2
(45) Date of Patent: Nov. 18, 2025

(54) CONTROL SYSTEM AND METHOD FOR A VEHICLE

(71) Applicant: JAGUAR LAND ROVER LIMITED, Warwickshire (GB)

(72) Inventors: David Wilson, Coventry (GB); James Balfour, Coventry (GB)

(73) Assignee: JAGUAR LAND ROVER LIMITED, Coventry (GB)

(*) Notice: Subject to any disclaimer, the term of this patent is extended or adjusted under 35 U.S.C. 154(b) by 859 days.

(21) Appl. No.: 17/626,855

(22) PCT Filed: Jul. 17, 2020

(86) PCT No.: PCT/EP2020/070299
§ 371 (c)(1),
(2) Date: Jan. 13, 2022

(87) PCT Pub. No.: WO2021/009352
PCT Pub. Date: Jan. 21, 2021

(65) Prior Publication Data
US 2022/0289187 A1   Sep. 15, 2022

(30) Foreign Application Priority Data

Jul. 17, 2019   (GB) ..................................... 1910226

(51) Int. Cl.
| | |
|---|---|
| B60W 30/14 | (2006.01) |
| B60K 35/10 | (2024.01) |
| B60K 35/22 | (2024.01) |
| B60K 35/28 | (2024.01) |
| B60K 35/80 | (2024.01) |
| B60W 50/16 | (2020.01) |

(Continued)

(52) U.S. Cl.
CPC ........... B60W 30/143 (2013.01); B60K 35/10 (2024.01); B60K 35/22 (2024.01); B60K 35/28 (2024.01);

(Continued)

(58) Field of Classification Search
CPC ............... B60W 30/143; B60W 50/16; B60W 2050/143; B60W 2050/146;

(Continued)

(56) References Cited

U.S. PATENT DOCUMENTS

| | | | |
|---|---|---|---|
| 9,103,671 B1* | 8/2015 | Breed | G01S 13/865 |
| 9,776,634 B2* | 10/2017 | Kelly | B60W 10/06 |

(Continued)

FOREIGN PATENT DOCUMENTS

| | | |
|---|---|---|
| CN | 104044593 A | 9/2014 |
| DE | 102013019374 A1 | 5/2015 |

(Continued)

OTHER PUBLICATIONS

Second Notice of Examination Opinion for Chinese Application No. 202080051388.1 dated Oct. 9, 2023.

(Continued)

*Primary Examiner* — Peter D Nolan
*Assistant Examiner* — Demetra R Smith-Stewart
(74) *Attorney, Agent, or Firm* — Carlson, Gaskey & Olds, P.C.

(57) ABSTRACT

Embodiments of the present invention provide a control system for a vehicle. The control system is configured to receive speed profile data indicative of a speed profile of the vehicle, wherein the speed profile represents one or more speeds at which the vehicle will be automatically controlled to travel at on a route ahead of the vehicle; receive route data indicative of the route ahead of the vehicle; determine, using the received speed profile data and the received route data, a representation comprising a relative position of the vehicle with respect to the route ahead and an indication of the speed profile on the route ahead; and output a signal indicative of the representation for provision to an output device.

15 Claims, 5 Drawing Sheets

(51) Int. Cl.
    *G01C 21/34*     (2006.01)
    *B60K 35/25*     (2024.01)
    *B60K 35/26*     (2024.01)
    *B60W 50/14*     (2020.01)

(52) U.S. Cl.
    CPC ............ *B60K 35/80* (2024.01); *B60W 50/16* (2013.01); *G01C 21/3492* (2013.01); *B60K 35/25* (2024.01); *B60K 35/26* (2024.01); *B60W 2050/143* (2013.01); *B60W 2050/146* (2013.01); *B60W 2520/10* (2013.01); *B60W 2552/15* (2020.02); *B60W 2552/30* (2020.02); *B60W 2555/20* (2020.02); *B60W 2555/60* (2020.02)

(58) Field of Classification Search
    CPC ......... B60W 2520/10; B60W 2552/15; B60W 2552/30; B60W 2555/20; B60W 2555/60; G01C 21/3492; G01C 21/3697; B60K 2360/168; B60K 2360/172; B60K 35/28; B60K 2360/1523; B60K 2360/175; B60K 35/00; B60K 35/22; G08G 1/0962; G08G 1/096725
    See application file for complete search history.

(56) References Cited

U.S. PATENT DOCUMENTS

| | | | |
|---|---|---|---|
| 10,501,076 B2 * | 12/2019 | Kelly | ................. F16H 61/0213 |
| 2013/0282264 A1 | 10/2013 | Bastianensen et al. | |
| 2014/0222277 A1 | 8/2014 | Tsimhoni et al. | |
| 2015/0073620 A1 | 3/2015 | Matsumura | |
| 2015/0197248 A1 * | 7/2015 | Breed | .............. G08G 1/096775 340/905 |
| 2016/0195407 A1 | 7/2016 | Sasaki | |
| 2016/0243945 A1 | 8/2016 | Zinner | |
| 2019/0063942 A1 | 2/2019 | Kang | |

FOREIGN PATENT DOCUMENTS

| | | |
|---|---|---|
| JP | 2008298547 | 12/2008 |
| JP | 2013169956 A | 9/2013 |
| JP | 2018198021 A * | 12/2018 |
| JP | 201914300 | 1/2019 |
| WO | 2017168517 | 11/2018 |

OTHER PUBLICATIONS

Notification of reasons for refusal for Japanese Patent Application No. 202-502618 mailed Jun. 4, 2024. [english translation].
Combined Search and Examination Report under Sections 17 and 18(3) for Application No. GB1910226.8 dated Jan. 9, 2020.
International Search Report and Written Opinion of the International Searching Authority for International application No. PCT/EP2020/070299 dated Oct. 21, 2020.
Patents Act 1977: Examination Report under Section 18(3) for Application No. GB1910226.8 dated Oct. 21, 2021.
Bernd Dornieden et al: "Anticipatory Energy-Efficient Longitudinal Vehicle Control," ATZ Worldwide, Feb. 24, 2012, pp. 24-28, XP55737969, DOI: 10.1365/s38311-012-0154-4.

* cited by examiner

CONTROL SYSTEM AND METHOD FOR A VEHICLE

TECHNICAL FIELD

The present disclosure relates to a control system and a method for a vehicle and particularly, but not exclusively, to determining a representation indicating a speed profile of a vehicle on a route. The speed profile represents one or more speeds which the vehicle will drive at on the route ahead. Aspects of the invention relate to a control system, a system, a vehicle, a method and computer software.

BACKGROUND

The movement of some vehicles may be controlled by an assistive driving feature of the vehicle, designed to aid the driver of the vehicle to control the vehicle's movement. The assistance may be provided by some assistive driving systems based, at least partly, on features of the surrounding environment of the vehicle. If the vehicle is controlled by an assistive driving feature in a way which is not expected by the driver, the driver may be disoriented and may not have confidence in the assistive driving feature to control the vehicle in an appropriate or safe way. If the driver understands why the assistive driving feature has acted to control the vehicle in a particular way, the driver may have increased confidence in the assistive driving feature, may feel safer, and may feel less disoriented.

It is an aim of embodiments of the invention to at least mitigate one or more of the problems of the prior art.

SUMMARY OF THE INVENTION

Aspects and embodiments of the invention provide a control system, a system, a vehicle, a method and computer software as claimed in the appended claims.

According to an aspect of the present invention there is provided a control system for a vehicle, the control system comprising one or more controllers. The control system may be configured to receive speed profile data indicative of a speed profile of the vehicle. The speed profile may represent one or more speeds at which the vehicle will be automatically controlled to travel at on a route ahead of the vehicle.

The control system may be configured to receive route data indicative of the route ahead of the vehicle. The received route data may comprise route terrain data recorded in real-time by one or more sensors of the vehicle. Such route terrain data may comprise, for example, one or more of a gradient of the route ahead, a route surface or terrain type of the route ahead, whether the route ahead is an on-road or off-road route, etc.

The control system may be configured to determine, using the received speed profile data and the received route data, a representation comprising a relative position of the vehicle with respect to the route ahead and an indication of the speed profile on the route ahead. The control system may be configured to output a signal indicative of the representation for provision to an output device.

The one or more controllers may collectively comprise at least one electronic processor having an electrical input for receiving the speed profile data and the route data; and at least one memory device coupled to the at least one electronic processor and having instructions stored therein. The at least one electronic processor may be configured to access the at least one memory device and execute the instructions stored therein so as to determine the representation comprising the relative position of the vehicle with respect to the route ahead and the indication of the speed profile on the route ahead, and output the signal for provision to the output device.

The representation may be a visual representation. The control system may be configured to output the signal indicative of the visual representation for provision to a display output device.

The representation may, alternatively or in addition, comprise an audio output and/or a haptic output configured to supplement the visual representation.

The indication of the speed profile may comprise a marker indicating a speed of the vehicle on the route ahead at the position indicated by the marker on the route.

The marker may indicate a value of the speed. The marker may indicate an acceleration or a deceleration.

The marker may indicate a speed at an indicated distance on the route ahead and/or a speed at an indicated time on the route ahead.

The marker may comprise one or more of:
 a plurality of contour lines spaced to represent a speed of the vehicle;
 a plurality of contour lines spaced to represent a change of speed of the vehicle;
 a colour-coded speed indicator, wherein a particular colour of the colour coding represents a particular speed of the vehicle;
 a colour-coded speed indicator, wherein a particular colour of the colour coding represents a particular change of speed of the vehicle; and
 a flag to indicate that the vehicle will change speed at the position indicated by the marker on the route.

The control system may be configured to repeatedly determine the representation:
 in real time; and/or
 periodically at predetermined time intervals; and/or
 at predetermined distance intervals; and/or
 at predetermined speed intervals; and/or
 at predetermined acceleration intervals.

The control system may be configured to output the signal indicative of a latest determined representation for provision to the output device.

The speed profile may represent the one or more speeds at which the vehicle will be automatically controlled to travel on the route ahead following the setting of a fixed target speed prior to determination to the speed profile. Alternatively, or in addition, the speed profile may represent the one or more speeds at which the vehicle will be automatically controlled to travel on the route ahead following the adaptive setting of a variable target speed, the setting of the variable target speed performed according to one or more characteristics of the route ahead sensed during motion of the vehicle.

The received route data may be indicative of an off-road driving route and/or an on-road driving route.

The received route data may be indicative of one or more of:
 a gradient of the route ahead;
 a route width of the route ahead;
 a curvature of the route ahead;
 a route surface of the route ahead;
 a current weather condition;
 a speed limit of the route ahead;
 a geographical location identifier;
 whether the route ahead is an on-road or off-road route;
 if the vehicle is currently braking;
 if the vehicle is currently accelerating;
 if the vehicle will come to a stop on the route ahead; and
 if there is a further vehicle proximate to the vehicle.

The received speed profile data may be further indicative of a speed limit below which the vehicle will be automatically controlled to travel at on the route ahead of the vehicle. The speed limit may be a "low speed" limit, e.g. 30 km/h, 20 km/h, 15 km/h, or a value less than 15 km/h.

The representation may further comprise one or more indicators configured to indicate one or more of:
a gradient of the route ahead;
a route width of the route ahead;
a curvature of the route ahead;
a route surface of the route ahead;
a current weather condition;
a speed limit on the route ahead;
a geographical location identifier;
whether the route ahead is an on-road or off-road route;
if the vehicle is currently braking;
if the vehicle is currently accelerating;
if the vehicle will come to a stop on the route ahead; and
if there is a further vehicle proximate to the vehicle.

The representation may comprise the relative position of the vehicle with respect to the route ahead, in which the route ahead is a schematic representation of a generic route and/or a representation of the current route ahead indicating one or more real world features of the route ahead.

The one or more real world features of the route ahead may comprise one or more of a gradient, a route width, a lane arrangement, a curvature, a route surface and a structure visible from the vehicle.

According to another aspect of the invention, there is provided a system for a vehicle, the system comprising the control system of any other aspect or embodiment and one or more of:
a speed profile data determiner configured to provide the speed profile data indicative of the speed profile of the vehicle;
a route data provider configured to provide the route data indicative of the route ahead of the vehicle; and
an output device configured to receive the output signal indicative of the representation and output the representation to a user.

The speed profile data determiner may comprise an all-terrain progress control system or an all-surface progress control system.

The route data may comprise route terrain data recorded in real-time by one or more sensors of the vehicle.

The system may comprise a display screen as the output device.

The output device may comprise one or more of: a display screen; a speaker; and a haptic feedback system.

According to another aspect of the invention, there is provided a vehicle comprising any control system or system disclosed herein.

According to another aspect of the invention, there is provided a method for a vehicle. The method may comprise receiving speed profile data indicative of a speed profile of the vehicle, wherein the speed profile represents speeds at which the vehicle will be automatically controlled to travel at on a route ahead of the vehicle.

The method may comprise receiving route data indicative of the route ahead of the vehicle, determining, using the received speed profile data and the received route data, a representation comprising a relative position of the vehicle with respect to the route ahead and an indication of the speed profile on the route ahead; and outputting a signal indicative of the representation for provision to an output device.

The route data may comprise route terrain data recorded in real-time by one or more sensors of the vehicle.

The method may comprise displaying, on a display screen, the received representation.

The method may comprise automatically controlling the vehicle to travel on the route ahead according to the speed profile.

According to another aspect of the invention, there is provided computer software which, when executed on a suitable processor, is arranged to perform any method disclosed herein. The computer software may be stored on a non-transitory computer-readable medium.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
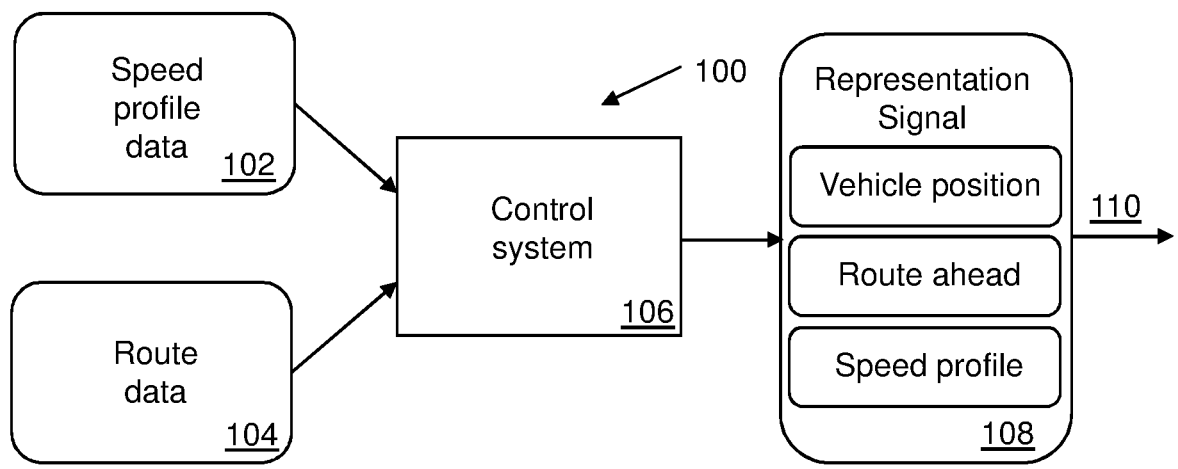
FIG. 1 shows a control system, as part of a system, according to examples disclosed herein.

The movement of some vehicles may be controlled by an assistive driving feature of the vehicle, designed to aid the driver of the vehicle to control the vehicle's movement. Certain vehicles may be equipped with a progress control feature which acts to control the movement of a vehicle according to some predetermined condition, such as maintaining a velocity below or at a preset velocity limit. An all-terrain progress control (ATPC) system may act to maintain the speed of the vehicle at a preset speed over a given terrain, such as an off-road, rocky, and/or water-feature terrain. Similarly, an all-surface progress control (ASPC) system may act as a form of cruise control, to maintain the speed of the vehicle below or at a preset speed over a given surface, such as a low-traction road surface.

Vehicles having an assistive driving function may display an icon or indicator light to inform the driver that the assistive driving function is operational. However, such an indicator is a static "ON/OFF" indicator, providing no more information than the assistive driving function being on or off. A driver is not informed of what sort of behaviour the vehicle will exhibit, and when, as a result of the assistive driving function being operational. Furthermore, if a vehicle is controlled by an assistive driving function which accounts for the environment of the vehicle as well as operating at or below a preset speed, the behaviour of the vehicle may deviate further from that expected by the driver than if, for example, the vehicle were controlled only to move at a preset speed.

It may benefit a driver or other passenger of a vehicle operating under the (at least partial) control of an assistive driving function to receive some indication of the likely behaviour of the vehicle before it occurs. Such an indication may help the driver feel less disoriented because the vehicle's behaviour is expected (since the driver has received an indication informing him/her what the vehicle is about to do). Such an indication may help the driver have confidence in the assistive driving function to control the operation of the vehicle safely and according to one or more preset conditions of its operation (such as not exceeding a preset speed, or maintaining a minimum distance between the vehicle and another object on or near the route).

Examples disclosed herein may be considered to address one or more of the abovementioned problems. Some examples described herein may provide a visual representation of a vehicle on a path/route. Overlaid onto the path/route is an indication, such as one or more "contour" lines, to show how the vehicle will behave on the route ahead. For example, the spacing between adjacent contour lines may illustrate a position at which the vehicle will accelerate/decelerate on the route ahead. The representation of the vehicle may be shown to move along the path as the vehicle moves within the environment. Variations and other examples are described herein, for example with reference to FIGS. 3-6.

FIG. 1 shows, schematically, a control system 106 for a vehicle 100 according to examples disclosed herein. The control system 106 comprises one or more controllers as discussed in more detail with respect to FIG. 2.

The control system 106 can receive, as input data, speed profile data 102 from a speed profile data provider. The speed profile data 102 is indicative of a speed profile of the vehicle 100. The speed profile represents one or more speeds at which the vehicle will be automatically controlled to travel at on a route ahead of the vehicle. For example, if the road ahead descends, the vehicle may be controlled by braking according to the gradient of the slope to maintain a preset speed. The speed profile of the vehicle may indicate that the vehicle will brake around the beginning of the descent to maintain a constant speed or that the vehicle may, for example, brake to slow the descent of the vehicle until the gradient is less steep, at which point the brakes may be released to allow the vehicle to speed up to the maximum preset speed.

The control system 106 can receive, as input data, route data 104 from a route data provider. The route data 104 is indicative of the route ahead of the vehicle. The route data 104 may comprise predetermined environment data, for example satellite navigation mapping of the local environment or other pre-recorded road data of the local environment. The route data may comprise data recorded by one or more sensors (e.g. sensors of the vehicle itself), such as by a camera, LIDAR, or weather sensors, for example. The data may be recorded in real-time as the vehicle moves through the environment. Such sensors may be able to detect, for example, local obstacles, local route directions, and road and/or weather conditions which affect how the vehicle will behave on the route ahead.

The control system 106 can determine, using the received speed profile data 102 and the received route data 104, a representation comprising a relative position of the vehicle with respect to the route ahead and an indication of the speed profile on the route ahead. The representation provides an indication to the driver or passenger of the vehicle of how the vehicle will behave on the route ahead. For example, the representation may indicate the position of the vehicle on the road and the speed profile it will follow. If the speed profile indicates the vehicle will brake (e.g. at a slippery road portion) and later accelerate (at a road portion with greater traction), then the representation may show these braking and acceleration future behaviours with respect to the current position of the vehicle, for example as acceleration contour lines.

The control system 106 can provide, as an output, a representation signal 108. The signal 108 is indicative of the representation and is output as an output signal 110 for provision to an output device (not shown). The representation signal 108 includes information on the vehicle position, the route ahead, and the speed profile of the vehicle. The representation, which can be displayed/output using the representation signal 108, is described in more detail with reference to the examples shown in FIGS. 3-6.

In the example embodiment, the representation is a visual representation and the control system 106 is configured to output the representation signal 108 as a display data output signal 110 for provision to a display output device, such as an instrument panel display or screen of a vehicle. The display or screen may be configured to display the determined representation and, optionally, one or more other visual indicators such as a current speed, oil level, remaining miles, etc. In some examples the output signal 108 may be provided, alternatively or in addition, for output to a portable electronic device which may be removably mounted in the vehicle, such as a mobile telephone or tablet computer. Such a portable electronic device may be configured to display the determined representation and perform at least one other function, such as playing music, providing satellite navigation assistance/route guidance, or another function.

The representation may further comprise an audio output, such as a buzz or beep when, for example, a change in vehicle speed is about to take place or an obstacle has been detected within a predetermined distance of the vehicle and/or on the expected future route of the vehicle. Another example audio output may be a voice output reciting a description of the behaviour the vehicle will exhibit in the near future (e.g. an announcement of "slowing in three seconds, two seconds, one second, slowing now"). The representation may comprise, alternatively or in addition, a haptic output, for example a vibration of the steering wheel just prior to a change in vehicle speed. Such audio and/or haptic outputs are optimally configured to supplement the visual representation but may, in some embodiments, usefully function alone or instead of a visual representation. The type (e.g. audio and/or haptic) and version (e.g. buzz, beep, tone, or voice) of the feedback may be user-selectable according to user preference.

The control system may be configured to determine the representation repeatedly or substantially continuously. That is, the representation may be re-determined and an updated representation signal 108 may be provided for output 110. The repeat may occur in real time. For example, there may be near-continuous input of data to the control system from which the representation is then determined in real time, to output a timely representation signal for output to the user. The control system may be configured to output the signal indicative of a latest determined representation for provision to the output device. In this way, the control system may provide up to date representation signals for output/display to the user, to see the current situation while driving.

In other examples, the repeat may occur periodically at predetermined time intervals. For example, every 5 seconds (or more e.g. 10 seconds, or less e.g. 2 seconds) the control system 106 may re-determine the representation and provide a re-determined representation signal 106 for output. In other examples, the repeat may occur at predetermined distance intervals (e.g. at every distance interval travelled, wherein the distance interval is, for example, a value less than 2 m, 2 m, 5 m, 10 m, 20 m, or a value more than 20 m). The distance may be a distance travelled along a route, a distance climbed or descended with respect to sea level, or a distance registered as having been travelled by an odometer, for example.

In other examples, the repeat may occur at predetermined speed intervals (e.g. at every speed difference interval travelled, wherein the speed difference interval is, for example, a value less than 1 km/h, 1 km/h, 2 km/h, 5 km/h, and more than 5 km/h). The difference value may be a magnitude to account for both an increase and a decrease in speed. The change in speed may be a change in instantaneous value, or change in value determined from a time averaged speed, for example. In other examples, the repeat may occur at predetermined speed intervals (e.g. at every speed difference interval travelled, wherein the speed difference interval is, for example, a value less than 1 km/h, 1 km/h, 2 km/h, 5 km/h, and more than 5 km/h).

In other examples, the repeat may occur at predetermined acceleration intervals (e.g. at every acceleration difference interval travelled, wherein the acceleration difference interval is, for example, a value less than $0.2$ km/h$^2$, $0.2$ km/h$^2$, $0.5$ km/h$^2$, $1$ km/h$^2$, and more than $1$ km/h$^2$) The difference value may be a magnitude to account for both acceleration and deceleration. The change in acceleration may be a change in instantaneous value, or change in value determined from a time averaged acceleration value, for example.

The control system 106 may be part of a larger system for a vehicle. The system may comprise the control system 106, and one or more of: a speed profile data determiner configured to provide the speed profile data 102 indicative of the speed profile of the vehicle; a route data provider configured to provide the route data 104 indicative of the route ahead of the vehicle; and an output device configured to receive the output signal 110 indicative of the representation 108 and output the representation to a user.

The speed profile data determiner may comprise a control system configured to determine the speed profile, for example by using information about the surrounding environment (e.g. gradient, surrounding obstacles, and road surface conditions) and a preset value for a maximum speed of the vehicle. The local environment information may be obtained, for example, from one or more sensors and/or from pre-recorded logged mapping information. The local environment information may be input by the user.

The route data provider may comprise a control system configured to provide an indication of the route ahead and/or surrounding the vehicle, for example using satellite navigation mapping, and/or one or more sensors of the vehicle (e.g. one or more front- and/or side-facing cameras).

The output device may comprise, for example, a display screen, a speaker, and/or a haptic feedback output device.

In some examples the control system 106 may be part of a vehicle. In some examples, the speed profile data 102 determiner, the route data 104 determiner, and the output device may be located on the vehicle with the control system 106, and may communicate with each other and/or with other vehicle systems wirelessly and/or by wired connection.

In some examples, the control system may be remote from and in communication with a system or systems of a vehicle (e.g. the control system may comprise a server remote from the vehicle). In some examples the control system may be located on the vehicle. In some examples the speed profile data 102 and/or the route data 104 may be obtained from systems located remotely from the control system 106 and provided thereto over a long range communication system (e.g. wirelessly or via the internet or cloud). For example, the route data 104 may be provided from a route data determiner located remotely from the vehicle (e.g. a remote server operating a mapping system). In some examples the speed profile data 102 and/or the route data 104 may be provided, from systems located at the vehicle, to the control system 106, and the representation signal 108 may be transmitted from the control system 106 to an output device in the vehicle e.g. via a wired connection, wirelessly, or over mobile communications. In some examples the speed profile data 102 may be provided from a speed profile determiner located at the vehicle (e.g. it may be controlled by a user of the vehicle, for example to set a maximum speed).

Figure 2:
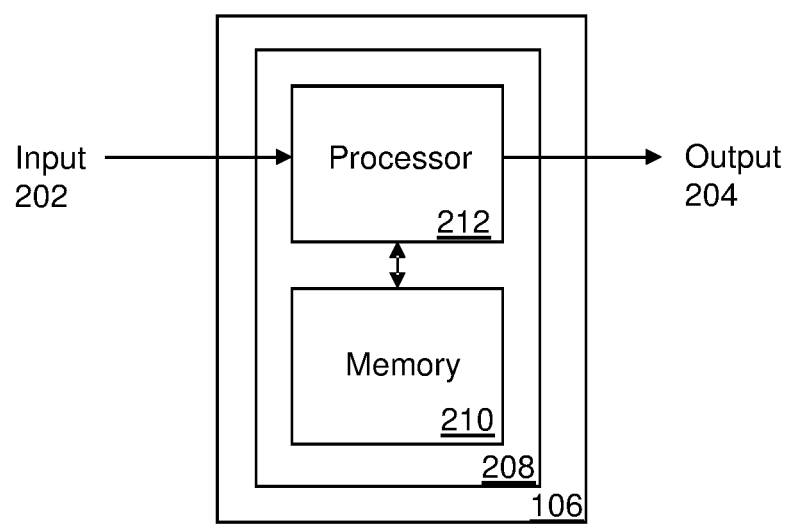
FIG. 2 shows a controller according to examples disclosed herein.

FIG. 2 shows a controller 208 according to examples disclosed herein. The control system 106 may comprise one or more controllers 208. FIG. 2 shows one controller 208 but more than one controller 208 may be present and in communication with one or more of the other controllers. The one or more controllers 208 comprise at least one electronic processor 212 having an electrical input 202 for receiving the speed profile data and the route data. The one or more controllers 208 comprise at least one memory device 210 coupled to the at least one electronic processor 212 and having instructions stored therein. The at least one electronic processor 212 is configured to access the at least one memory device 210 and to execute the instructions stored therein so as to determine the representation comprising the relative position of the vehicle with respect to the route ahead and the indication of the speed profile on the route ahead, and output the signal for provision to the output device via an output 204.

FIGS. 3a-d show a schematic visual and audio representation according to examples disclosed herein. In other examples only a visual representation, a visual and haptic representation, or a visual, audio and haptic representation may be provided. In some examples only an audio and/or a haptic representation may be provided.

The representation in the examples of FIGS. 3a-d comprises the relative position of the vehicle 304 with respect to the route ahead 306, in which the route ahead is a schematic representation of a generic route. In these examples the generic route is shown as two converging straight lines representing a straight, flat, uniform width road.

In FIGS. 3a-d, the representation comprises a representation of the vehicle 304, a representation of the route ahead 306, and an indication of the speed profile, in this example in the form of constant-speed contour lines 302a, 302b, 302c. The contour lines (and other elements of the representation, e.g. the vehicle and schematic route) may be displayed as, for example, single colour illuminated lines on a dark background, or may be dark lines displayed on a light background. The representation may be displayed, for example, on an LED-type display screen, an LCD screen, or other suitable display screen.

The speed profile representation may be said to comprise a marker such as a contour line 302a, 302b, 302c. Another term for the marker is a "progress indicator" as it indicates how the vehicle is progressing and/or will progress with respect to the speed profile. The markers 302a, 302b, 302c indicate a speed of the vehicle on the route ahead at the position indicated by the marker on the route. Closer spaced contour lines 302b indicate the vehicle will decelerate at the location indicated thereby. At this location, the vehicle speed will decrease and thus a smaller distance will be traversed in a unit of time as indicated by the more closely spaced contour lines. More widely spaced contour lines 302c, on the other hand, indicate the vehicle will accelerate at the location indicated thereby. At this location, the vehicle speed will increase and so a greater distance will be traversed in the unit of time as indicated by the more widely spaced contour lines.

Figure 3A:
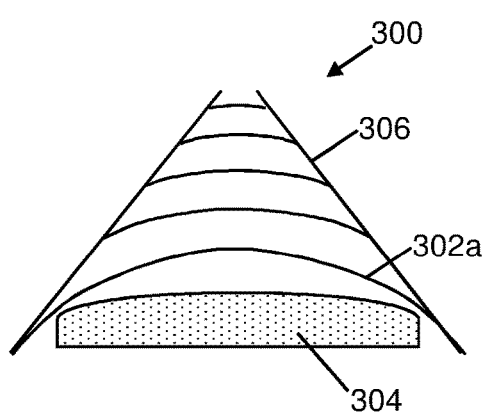
FIGS. 3a-d show a schematic visual and audio representation according to examples disclosed herein.

In FIG. 3a, the contour lines 302a are shown equally spaced, representing that the vehicle 304 will travel at a constant speed (e.g. 10 km/h) for the illustrated distance (i.e. while the contour lines 302a are spaced equally). No acceleration or deceleration is expected to take place in the distance ahead indicated by the represented route.

Figure 3B:
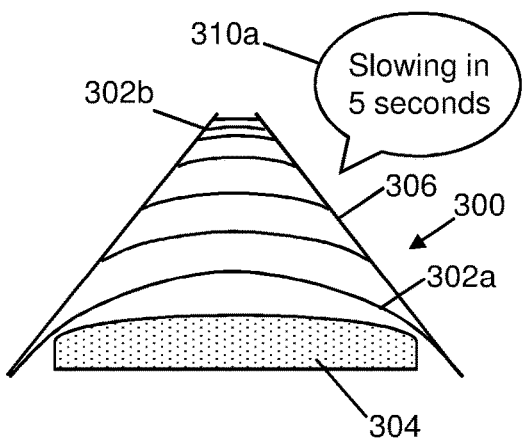

In FIG. 3b, terrain is determined to be ahead of the vehicle which will require the vehicle to decelerate to adhere to the set speed profile (for example, the road ahead may slope downwards, or have a lower-friction surface, than the road where the vehicle is currently located). The terrain ahead may be determined to have this changed property compared to the terrain where the vehicle is currently located by, for example, one or more sensor detections and/or prediction based on recorded map information (e.g. recorded in a survey of the terrain). To indicate that the terrain will change, and thus the behaviour (i.e. speed) of the vehicle will change accordingly, the visual representation 300 shows more closely-spaced contour lines 302b ahead of the vehicle. In this example there is also an audio indication of the imminent deceleration of the vehicle with a time indication of when this will happen, by means of a voice message 310a reciting "slowing in 5 seconds". In other examples the audio message need not provide a quantitative measure of when the vehicle behaviour will change and may simply recite "slowing soon", for example. It may be advantageous to provide the user with sufficient information to inform them of the vehicle behaviour so that they are not caught by surprise by a change in vehicle behaviour and they trust the vehicle to be controlled correctly/safely, but not so much information that it is difficult for the user to process safely e.g. whilst driving/steering the vehicle.

Figure 3C:
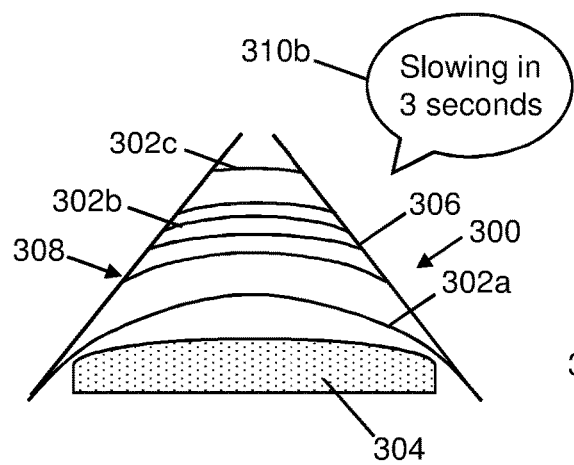

As the vehicle travels towards the changes in terrain in real life, the visual representation changes as shown between FIG. 3b and FIG. 3c. The region of more closely spaced contour lines 302b is shown closer to the vehicle 304 as the vehicle 304 travels towards this region 302b. The vehicle 304 is still travelling at constant speed as it is still shown as being located on the equally spaced first region of contour lines 302a, but it is travelling towards the deceleration point 308. In this example there is also an audio indication of the more imminent deceleration of the vehicle, by means of a voice message 310b reciting "slowing in 3 seconds".

Figure 3D:
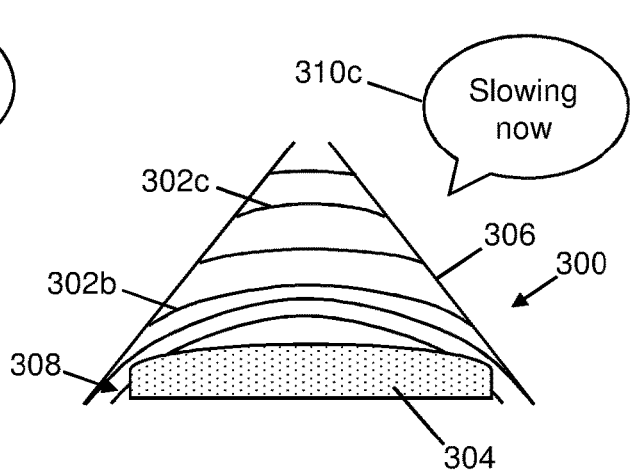

In FIG. 3d, the vehicle 304 has reached the deceleration point 308 and begins to gradually reduce speed (e.g. to 8 km/h) in the deceleration zone 302b. Equally spaced contour lines 302c ahead of the vehicle 304 represent illustrate to the user that the vehicle 304 will travel at a constant speed (e.g. 8 km/h) post-deceleration. In this example there is also an audio indication of the current deceleration of the vehicle, by means of a voice message 310c reciting "slowing now".

The markers 302a, 302b, 302c may be considered to indicate a speed of the vehicle 304 on the route ahead 306 at the position indicated by the marker 302a, 302b, 302c on the route 306. In this example the marker indicates a speed at an indicated time on the route ahead (e.g. deceleration in five, or three, seconds). In other examples, the marker may indicate the speed at an indicated distance on the route ahead (e.g. deceleration in 20 m, in 10 m etc.). The markers 302a, 302b, 302c may be considered to comprise a plurality of contour lines spaced to represent a speed of the vehicle (in this case, equally spaced), and a plurality of contour lines spaced to represent a change of speed of the vehicle (in this case, lines changing from equally spaced at a first spacing to equally spaced lines with a second spacing smaller than the first spacing, as the vehicle will decelerate).

Thus, to provide the visual outputs shown in FIGS. 3a-d, the control system 106 has performed the steps of receiving speed profile data indicative of a speed profile of the vehicle (travel at a first speed in a first region 302a, and decelerate to a second speed in a second region 302b); that is, the speed profile represents one or more speeds at which the vehicle will be automatically controlled to travel at on a route ahead of the vehicle. The control system has also received route data indicative of the route ahead of the vehicle (in this example, the route data is displayed as a schematic route 306 and used to show, in the representation, the relative position of the vehicle and the planned vehicle behaviour due to the speed profile). The control system determines, using the received speed profile data and the received route data, a representation 300 comprising a relative position of the vehicle 304 with respect to the route ahead 306 and an indication of the speed profile 302a-c on the route ahead. The control system then outputs a signal indicative of the representation for provision to an output device, which produces a visual output such as that shown in FIGS. 3a-d.

In some examples, the markers may comprise a colour-coded speed indicator, wherein a particular colour of the colour coding represents a particular speed of the vehicle and/or a particular change of speed of the vehicle. For example, green may indicate a steady speed, orange may indicate imminent acceleration or deceleration, and red may indicate a region of acceleration or deceleration.

In some examples, the marker may comprise a flag to indicate that the vehicle will change speed at the position indicated by the marker on the route. For example, a point marker may be present on the route representation to indicate that the vehicle speed will change when that point is reached in real life. Such a flag may include a textual indicator showing the change that will take place (e.g. "slowing here to 5 km/h").

In some systems providing driving assistance, a preset speed may be entered prior to driving (e.g. aim to drive as close to 20 km/h as possible) and the driving assistance aims to control the vehicle to move at this speed (e.g. by accelerating when an upwards slope is reached, or by decelerating when slippery ground is reached). A system in which the set target speed of the vehicle may be varied in this way, i.e. according to a predicted acceleration requirement (to reach the preset target speed for a given terrain) may be called an ATPC or ASPC system. In such a scenario, the control system may operate using a speed profile which represents one or more speeds at which the vehicle will be automatically controlled to travel on the route ahead following the setting of a fixed target speed (e.g. 20 km/h) prior to determination to the speed profile.

In some systems providing driving assistance, a preset speed may be entered prior to driving (e.g. aim to drive as close to 20 km/h as possible) and the driving assistance uses this speed, as well as one or more sensed conditions sensed during movement of the vehicle, to control the vehicle to move at the preset speed (e.g. by controlling the vehicle to decelerate over a longer distance when reaching a downwards slope if the route is sensed to be slippery, for example because of rain, or by controlling the vehicle to decelerate to avoid reaching a vehicle sensed by a front facing camera to be present in front of the vehicle on the route). In such a scenario, the control system may operate using a speed profile which represents the one or more speeds at which the vehicle will be automatically controlled to travel on the route ahead following the adaptive setting of a variable target speed. The setting of the variable target speed may be performed according to one or more characteristics of the route ahead sensed during motion of the vehicle. A system in which the set target speed of the vehicle may be varied according to both a sensed situation and a predicted acceleration requirement (to reach the preset target speed for a given terrain) may be called an adaptive ATPC or ASPC system.

In some examples, the received route data is indicative of an off-road driving route. For example, a vehicle may be equipped with an ATPC system and the surrounding environment of the vehicle may be sensed by one or more sensors. Such sensors may, for example, be located with the vehicle (e.g. a front and side facing camera), and/or may be located away from the vehicle, for example another vehicle in the vicinity, or at a fixed sensing station such as a weather station on the off-road driving site. A sensor located away from the vehicle may be in communication with the control system of the vehicle by wireless LAN or other mobile communications. In other examples, the received route data is indicative of an on-road driving route. For example, a vehicle may be equipped with an ASPC system and information defining the surrounding environment of the vehicle may be provided to the control system, for example from a map database and/or GPS navigation information and/or from one or more sensors.

Received route data may be indicative of one or more of: a gradient of the route ahead (e.g. 1:10 slope uphill, 8° slope downhill); a route width of the route ahead (e.g. 3.3 m wide, 4 traffic lanes wide); a curvature of the route ahead (e.g. sharp turn right, bend left); a route surface or terrain type of the route ahead (e.g. asphalt, gravel, grass and mud, wet, dry, having a coefficient of friction within a given range); a current weather condition (e.g. rainy, icy, foggy, dry); a speed limit of the route ahead (e.g. 30 mph, 60 kmph); a geographical location identifier (a town name, street name, postcode, latitude and longitude coordinates); whether the route ahead is an on-road or off-road route; and if there is a further vehicle proximate to the vehicle (e.g. another off-road vehicle is ahead of the vehicle on an off-road driving course).

The received speed profile data may be further indicative of a speed limit below which the vehicle will be automatically controlled to travel at on the route ahead of the vehicle. For example, a portion of an off-road driving course may have a speed limit of below 10 km/h, and the received speed profile may factor in that this speed limit must not be exceeded in the relevant portion of the driving course, whereas elsewhere the speed limit may be e.g. 20 km/h.

FIGS. 4a-d show a schematic visual representation 400 including a further vehicle according to examples disclosed herein. This scenario may be considered to relate to adaptive setting of a variable target speed in the speed profile and providing the adaptive behaviour of the vehicle to a vehicle occupant in the representation 400. The representation 400 in these examples comprises the relative position of the vehicle 404 with respect to the route ahead 406, in which the route ahead 406 is a schematic representation of a generic route. Features in common with the examples shown in FIGS. 3a-d will not be described in detail again.

The indication of the speed profile in this example is a series of colour-coded, constant-speed contour lines 402a, 402b, 402c. The colour-coded, constant-speed contour lines may be considered as markers 402a, 402b, 402c which indicate a speed of the vehicle on the route ahead at the position indicated by the marker on the route. The region of deceleration 402b is shown as more closely spaced contour lines in a different colour region to the regions of constant speed 402a, 402c. For example, the deceleration region 402b may be orange, while the constant speed regions 402a, 402c may be green. Different colour schemes may be used and may be set according to user preference in some examples. In some examples the colour scheme may automatically be selected according to ambient light conditions (e.g. a different colour scheme may be used in daylight compared to dark/night driving conditions).

Figure 4A:
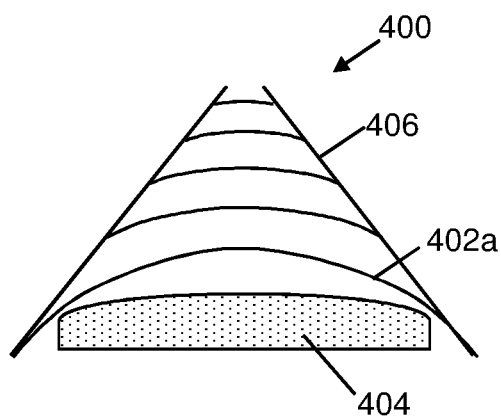
FIGS. 4a-d show a schematic visual representation including a further vehicle according to examples disclosed herein.

In FIG. 4a, the contour lines 402a are shown equally spaced, representing that the vehicle 404 will travel at a constant speed. No other vehicles have yet been detected or determined to be on the route for which the current vehicle motion needs to change to accommodate.

Figure 4B:
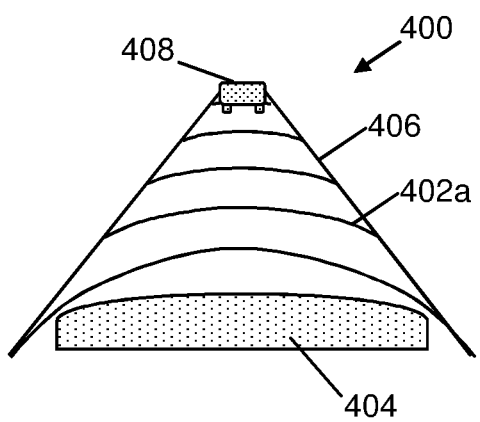

In FIG. 4b, a vehicle 408 is detected ahead of the current vehicle 404. The vehicle may be detected, for example, by a front facing camera, radar and/or lidar of the vehicle 404. The representation signal now includes data causing a schematic representation of another vehicle 408 to be displayed for the user. The distance ahead of the vehicle 404 of the second vehicle 408 may be determined and provided to the control system so the control system can determine a representation signal which represents the second vehicle 408 at a representative distance ahead on the displayed representation 400. Thus, the user can see, from the displayed representation 400, that the control system has information that there is a vehicle 408 on the route ahead. The user may have increased confidence that the vehicle's driver assistance controls will control the vehicle in a safe way to account for the presence of the other vehicle.

Figure 4C:
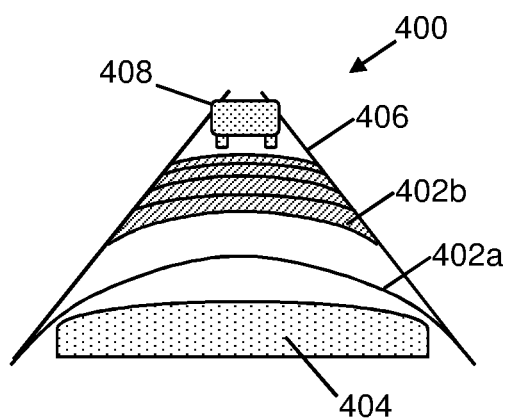

In FIG. 4c the visual representation changes to show that the second vehicle 408 is now closer to the vehicle 404, and to avoid driving too close to the vehicle 408 ahead, the vehicle 404 will decelerate. This deceleration is part of the speed profile of the vehicle, and is shown in the representation 400 as a region of more closely spaced contour lines 406b coloured differently to the regions 406a, 406c indicating constant speed. The user can therefore expect the vehicle to decelerate, and can see when that will take place from the representation 400. Thus the user does not experience unexpected vehicle braking and understands why the vehicle is braking.

Figure 4D:
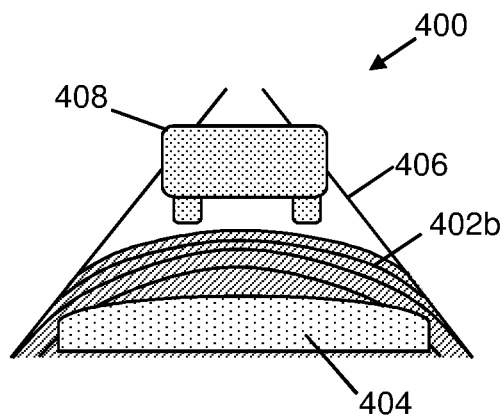

In FIG. 4d, the vehicle 404 has reached the deceleration point 408 and begins to gradually reduce speed to avoid driving too close to the vehicle in front 408.

Figure 5:
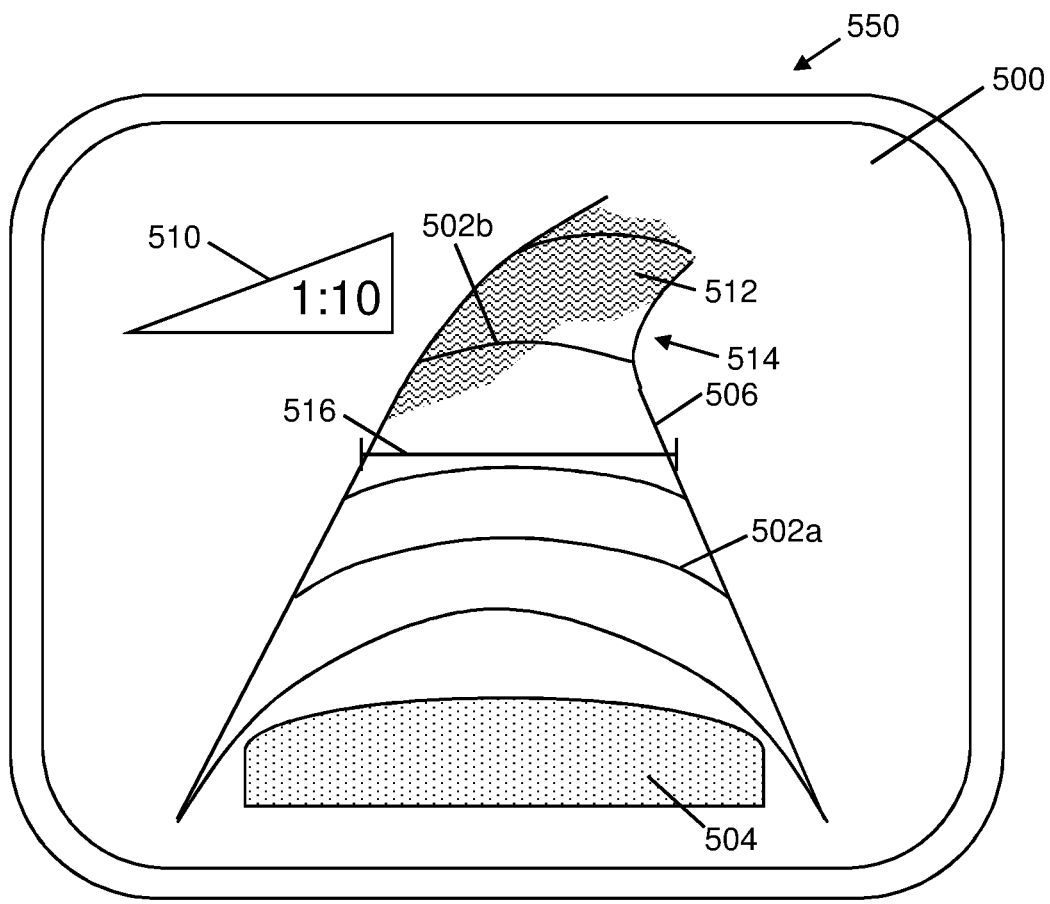
FIG. 5 shows a real-world visual representation according to examples disclosed herein.

FIG. 5 shows a real-world visual representation 500 according to examples disclosed herein. The representation 500 may be considered to indicate one or more real world features of the route ahead. The output device 550 is displaying a visual representation 550 comprising a relative position of the vehicle 504 with respect to the route ahead 506. The representation of the route ahead has a route width 516 and a curvature 514 representative of the real world environment. Also displayed is an indicator 510 showing the gradient of the route ahead (as a 1:10 ascent). The route surface 512 ahead of the vehicle is also indicated as changing compared with the route surface where the vehicle 504 is currently located (for example, it may be packed earth at the position 512 ahead compared to a gravelled route elsewhere). Because the route ahead of the vehicle 504 is uphill, with a greater friction surface 512, the vehicle will be controlled to accelerate at the route ahead. This planned acceleration is indicated by more widely spaced contour lines 502b on the route ahead compared with the constant speed contour lines 502a prior to arriving at the change in route surface 512.

Such a "real-world" representation may also, or instead, include one or more of a current weather condition; a speed limit on the route ahead; if the vehicle is currently braking or if the vehicle is currently accelerating (e.g. by illumination of an LED or display of an icon on the display 500); if the vehicle will come to a stop on the route ahead; and if there is a further vehicle proximate to the vehicle. Of course, a balance between providing information to a user and avoiding overloading the user with information is advantageous. The particular representation type (from real world as shown in FIG. 5, or schematic as shown in FIGS. 3a-3d and 4a-4d) may be selected by a user, as well as which particular indicators are shown in a representation (for example, one user may not wish to be shown the particular gradient, whereas a different user may wish to see the gradient but not wish to see a change in road surface type in the representation).

The representation in FIG. 5 is displayed on a display screen output device. In other examples, the output device may comprise a speaker for audio output, and/or a haptic feedback system for tactile output.

Figure 6:
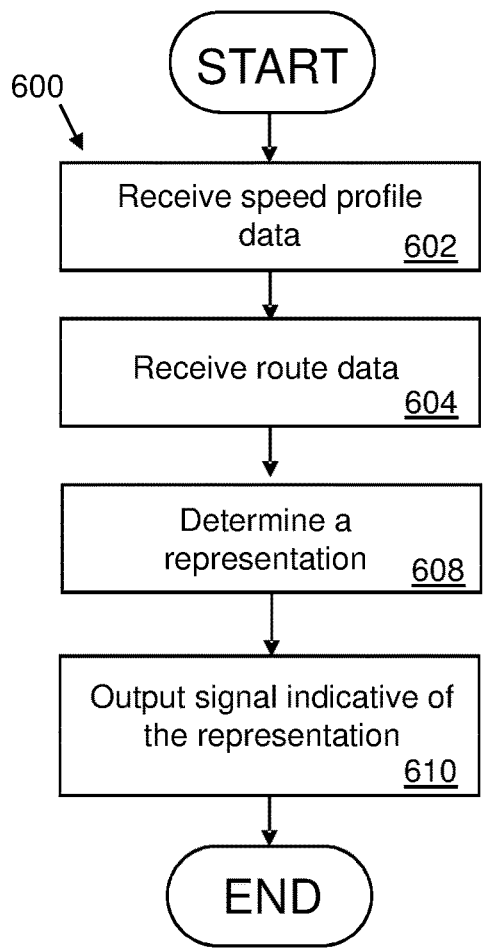
FIG. 6 shows a method for a vehicle according to examples disclosed herein.

FIG. 6 shows a method 600 for a vehicle according to examples disclosed herein. The method 600 comprises: receiving speed profile data 602 indicative of a speed profile of the vehicle, wherein the speed profile represents speeds at which the vehicle will be automatically controlled to travel at on a route ahead of the vehicle; receiving route data 604 indicative of the route ahead of the vehicle; determining, using the received speed profile data and the received route data, a representation 608 comprising a relative position of the vehicle with respect to the route ahead and an indication of the speed profile on the route ahead; and outputting a signal 610 indicative of the representation 608 for provision to an output device.

In some examples the method may further comprise displaying, on a display screen, the received representation (e.g. as shown in FIG. 5). In some examples the method may further comprise automatically controlling the vehicle to travel on the route ahead according to the speed profile, i.e. so that the vehicle is controlled to move according to the displayed representation.

Figure 7:
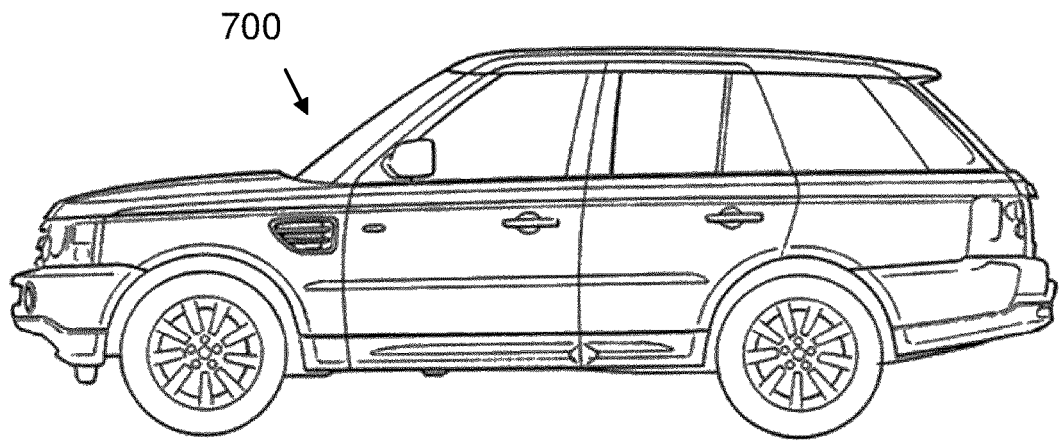
FIG. 7 shows a vehicle according to examples disclosed herein.

FIG. 7 shows a vehicle 700 according to examples disclosed herein. The vehicle comprises the control system described herein, and may comprise, for example, a speed profile data determiner; a route data provider; an output device; and one or more sensors configured to determine environmental factors surrounding the vehicle which may be used to determine the speed profile (e.g. humidity, obstacles on the route, proximal vehicle presence).

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, certain embodiments provide a program comprising code for implementing a system or method as claimed in the appended claims, and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any methods or processes so disclosed. The claims should not be construed to cover merely the foregoing examples, but also any embodiments which fall within the scope of the claims.

The invention claimed is:

1. A control system for a vehicle, the control system comprising at least one controller configured to:
   receive speed profile data indicative of a speed profile of the vehicle, wherein the speed profile represents one or more speeds at which the vehicle will be automatically controlled to travel on an off-road route ahead of the vehicle following adaptive setting of a variable target speed, the setting of the variable target speed performed according to one or more characteristics of the off-road route ahead sensed during motion of the vehicle;
   receive route data indicative of the off-road route ahead of the vehicle, the route data comprising route terrain data corresponding to the off-road route ahead and recorded in real-time by at least one sensor of the vehicle;
   determine, using the received speed profile data and the received route data, a representation comprising a relative position of the vehicle with respect to the off-road route ahead and an indication of the speed profile on the off-road route ahead;
   output a signal indicative of the representation for provision to an output device, the representation providing an indication to a driver or passenger of the vehicle of how the vehicle will behave on the off-road route ahead; and
   control the vehicle to travel on the off-road route at the variable target speed in accordance with the speed profile.

2. The control system of claim 1, wherein
   the representation comprises at least one of a visual representation, an audio output, and a haptic output;
   the output device comprises at least one of a display, an audio output device, and a haptic feedback device; and
   the signal indicative of the representation is configured for provision to the corresponding at least one of the display, the audio output device and the haptic feedback device.

3. The control system of claim 1, wherein the indication of the speed profile comprises a marker configured to indicate a speed of the vehicle on the off-road route ahead at the position indicated by the marker on the route.

4. The control system of claim 3, wherein the marker is configured to indicate
   a speed at an indicated distance on the off-road route ahead, or
   a speed at an indicated time on the off-road route ahead.

5. The control system of claim 3, wherein the marker comprises one or more of:
   a plurality of contour lines spaced to represent a speed of the vehicle;
   a plurality of contour lines spaced to represent a change of speed of the vehicle;
   a color-coded speed indicator including a color that represents the speed of the vehicle;
   a color-coded speed indicator including a color that represents the change of speed of the vehicle; and
   a flag to indicate that the vehicle will change speed at the position indicated by the marker on the off-road route.

6. The control system of claim 1, wherein the at least one controller is configured to
   determine the representation in real time or at predetermined time, distance, speed or acceleration intervals; and
   output the signal indicative of a latest determined representation for provision to the output device.

7. The control system of claim 1, wherein the speed profile represents one or more of:
   the one or more speeds at which the vehicle will be automatically controlled to travel on the off-road route ahead following setting a fixed target speed prior to determination of the speed profile; and
   the one or more speeds at which the vehicle will be automatically controlled to travel on the route ahead following adaptively setting a variable target speed, the setting of the variable target speed being performed according to one or more characteristics of the off-road route ahead sensed during motion of the vehicle.

8. The control system of claim 1, wherein the received route data is indicative of:
   a gradient of the off-road route ahead;
   a route width of the off-road route ahead;
   a curvature of the off-road route ahead;
   a route surface of the off-road route ahead;
   a speed limit of the off-road route ahead;
   a current weather condition;
   a geographical location identifier;
   whether the vehicle is currently braking;
   whether the vehicle is currently accelerating;
   whether the vehicle will come to a stop on the off-road route ahead; and
   whether there is a further vehicle proximate to the vehicle.

9. The control system of claim 1, wherein the representation comprises one or more indicators configured to indicate, one or more of:
   a gradient of the off-road route ahead;
   a route width of the off-road route ahead;
   a curvature of the off-road route ahead;
   a route surface of the off-road route ahead;
   a speed limit of the off-road route ahead;
   a current weather condition;
   a geographical location identifier;
   whether the vehicle is currently braking;
   whether the vehicle is currently accelerating;
   whether the vehicle will come to a stop on the off-road route ahead; and
   whether there is a further vehicle proximate to the vehicle.

10. The control system of claim 1, wherein
    the received speed profile data is indicative of a speed limit; and
    the one or more speeds at which the vehicle will be automatically controlled to travel on the route ahead of the vehicle are below the speed limit.

11. The control system of claim 1, wherein the representation of the off-road route ahead comprises
    a schematic representation of a generic route, or
    a representation of the current off-road route ahead indicating one or more real world features of the off-road route ahead.

12. A vehicle comprising the control system of claim 1.

13. A method, comprising:
    receiving speed profile data indicative of a speed profile of a vehicle, wherein the speed profile represents speeds at which the vehicle will be automatically controlled to travel on an off-road route ahead of the vehicle following adaptive setting of a variable target speed, the setting of the variable target speed performed according to one or more characteristics of the off-road route ahead sensed during motion of the vehicle;
    receiving route data indicative of the off-road route ahead of the vehicle, the route data comprising route terrain data corresponding to the off-road route ahead and recorded in real-time by one or more sensors of the vehicle;

determining, using the received speed profile data and the received route data, a representation comprising a relative position of the vehicle with respect to the off-road route ahead and an indication of the speed profile on the off-road route ahead;

outputting a signal indicative of the representation for provision to an output device, the representation providing an indication to a driver or passenger of the vehicle of how the vehicle will behave on the off-road route ahead; and controlling the vehicle to travel on the off-road route at the variable target speed in accordance with the speed profile.

14. The method of claim 13, comprising:

displaying, on a display screen, the received representation; and/or automatically controlling the vehicle to travel on the off-road route ahead according to the speed profile.

15. A non-transitory storage medium containing computer software which, when executed by at least one processor, causes the at least one processor to perform the method of claim 13.

* * * * *